Jan. 27, 1953  R. M. PAGE  2,627,070
RADIO ECHO APPARATUS
Filed Nov. 13, 1945
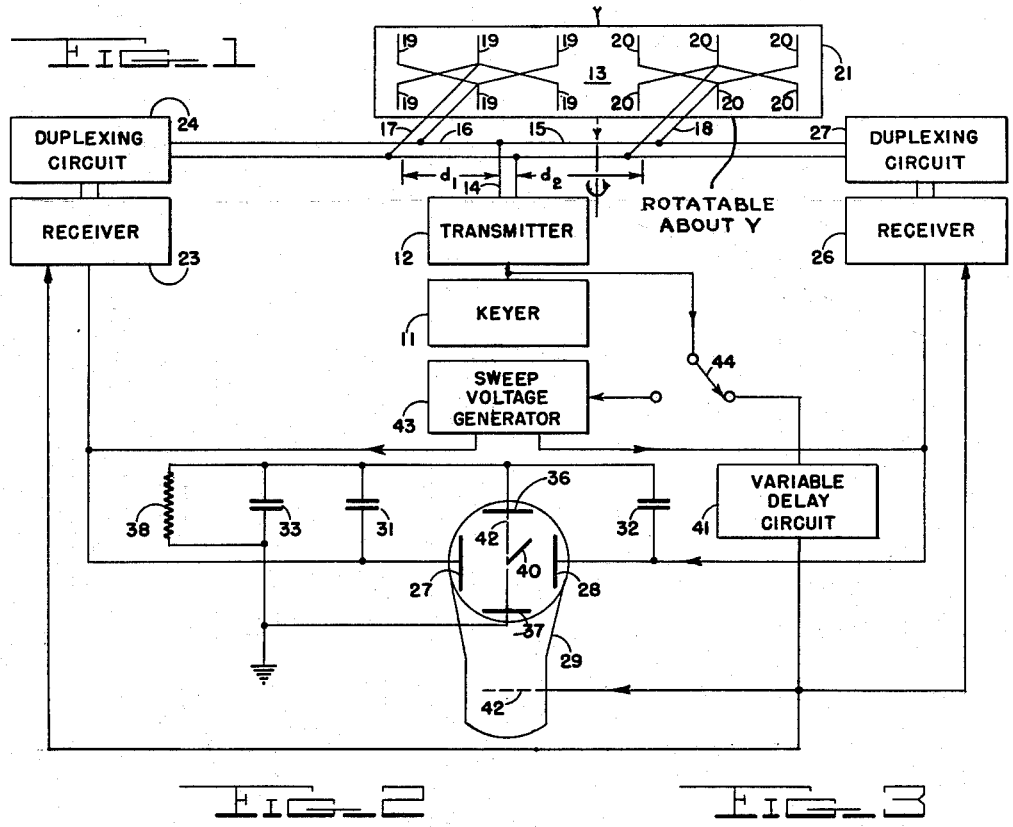
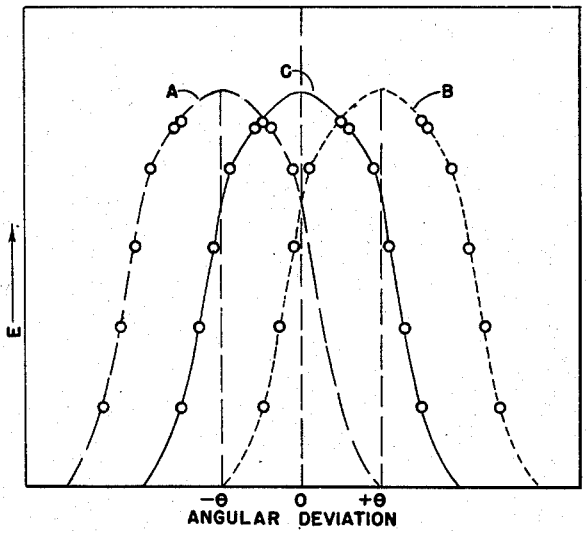
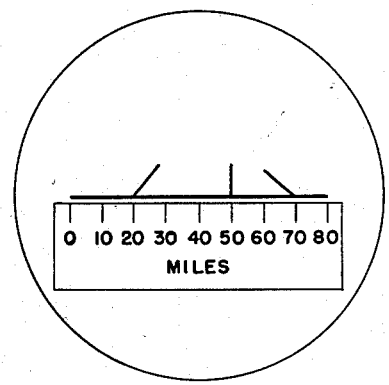
ROBERT M. PAGE Patented Jan. 27, 1953

2,627,070

UNITED STATES PATENT OFFICE 2,627,070

RADIO ECHO APPARATUS

Robert M. Page, Washington, D. C.

Application November 13, 1945, Serial No. 628,336

7 Claims. (Cl. 343—11)

(Granted under Title 35, U. S. Code (1952), sec. 266)

This invention relates to radio echo apparatus and, more particularly, to a radio echo apparatus incorporating means for accurately indicating the direction of remote objects.

An object of the present invention is to provide radio echo apparatus including novel means for continuously indicating the direction of remote objects.

Another object of the present invention is to provide radio echo apparatus including novel means for continuously indicating the direction of remote objects independently of variations of magnitude of the received energy reflected from said remote objects.

Other objects and features of the present invention will appear more fully hereinafter from the following detailed description when considered in connection with the accompanying drawings which disclose an exemplary embodiment of the invention. It is to be expressly understood, however, that the drawings are intended for purposes of illustration only and not as a definition of the limits of the invention, reference for the latter purpose being had to the appended claims.

In the drawings:

Fig. 1 is a diagrammatic showing of a radio echo apparatus embodying the invention;

Fig. 2 is a graphical representation of the directional characteristics of the antenna system 13 of the apparatus shown in Fig. 1; and Fig. 3 shows a typical indication produced on the screen of the cathode ray tube.

Referring now more particularly to Fig. 1, there is shown a radio echo apparatus in accordance with the invention. The keyer 11 periodically produces voltage impulses having a time duration which is short compared with the repetition period of said impulses. The voltage impulses produced by keyer 11 are applied to transmitter 12 which functions to generate an impulse of radio frequency energy coincidentally with each of said voltage impulses. The radio frequency energy output of transmitter 12 is applied to antenna 13 through transmission line sections 14, 15, 16, 17, 18. Receiver 23 is coupled to antenna 13 through duplexing circuit 24. Receiver 26 is coupled to antenna 13 through duplexing circuit 27. Duplexing circuits 24, 27 operate during each transmission of an impulse of radio frequency energy to limit to a low value the magnitude of said energy applied to receivers 23 and 26, thereby enabling the same antenna 13 to be used both for the transmission and for the reception of radio frequency energy. Thus, transmitted impulses of radio frequency energy reflected from a remote object and intercepted by antenna 13, after a time delay which is proportional to the range of said object, are applied to receivers 23 and 26. Receivers 23 and 26 are designed to detect and amplify the reflected energy impulses intercepted by antenna 13 and produce output voltage impulses in accordance with the envelope of said energy impulses. Receiver 23 and 26 preferably produce equal amounts of amplification.

The characteristics of antenna 13 will now be described in greater detail. Antenna 13 preferably is arranged to be rotatable about an axis which is designated Y—Y in Fig. 1. Referring now to Fig. 2, the curves A, B, C, represent the directional characteristics of antenna 13 in a plane perpendicular to axis Y—Y. Curve C indicates the relative intensity E of the field radiated by antenna 13 due to energy supplied thereto by transmitter 12, plotted against angular deviation from the axis O of the directional beam. Curves A and B indicate the relative directional response E of antenna 13 to received energy as measured at the input terminals of receivers 26 and 23, respectively. The term "response," as used herein, may be defined as the voltage due to received energy which is applied by the antenna to a receiver connected thereto. In the arrangement of the present invention the receivers 23 and 26 provide equal amplification so that the relative magnitudes of the output voltages of said receivers are the same as the relative magnitudes of the respective input voltages applied thereto by antenna 13. Curve A indicates the directional response of antenna 13 at receiver 26. Curve B indicates the directional response of antenna 13 at receiver 23. Since the amplification of the two receivers are equal, the ordinates E of curves A and B may also represent the relative output voltages of receivers 23 and 26, respectively.

When said remote object lies at an angle $-\theta$ relative to the axis O of the directional beam, the output voltage of receiver 26 is at its maximum value and greater than the output voltage of receiver 23. Similarly, when said remote object lies at an angle $+\theta$ the output voltage of receiver 23 is at its maximum and greater than the output voltage of receiver 26. When said remote object lies on the axis O of the directional beam, the output voltages of receivers 23 and 26 are equal and substantially less than the maximum values. The output voltages of receivers 23 and 26 are applied to the horizontal deflection plates 27 and 28, respectively, of cathode ray tube 29. Consequently, the horizontal component of the deflection of the electron beam of cathode ray tube 29 is proportional to the algebraic difference between the respective output voltages of receivers 23 and 26, and the direction of said deflection indicates the direction of said remote object relative to the axis O of the directional beam.

The output voltages of receivers 23 and 26 are applied through a voltage divider network which may comprise condensers 31, 32, 33 to one vertical deflection plate 36 of cathode ray tube 29. The capacitances of condensers 31 and 32 preferably are equal. The voltage applied to vertical deflection plate 36 is then proportional to the sum of the output voltages of receivers 23 and 26. Thus, the vertical component of the deflection of the electron beam of cathode ray tube 29 is proportional to the sum of the output voltages of the two receivers 23, 26. Assuming that receivers 23, 26 produce positive output voltage impulses in response to received impulses of energy, the resulting vertical deflection will be upward from the normal center position. Consequently, the angular position of the trace 40 produced on the fluorescent screen of cathode ray tube 29 relative to the vertical axis 42 of said screen indicates the direction, relative to the axis of the directional beam, of a remote object from which reflected energy is intercepted by antenna 13.

When the axis O of the directional beam of energy radiated by antenna 13 coincides with the direction of a remote object, the output voltages of receivers 23 and 26 remain equal and the luminous line 40 remains coincident with the vertical axis 42 of the screen of cathode ray tube 29, irrespective of variations of the magnitude of said output voltages. Consequently, the axis O of antenna 13 may be aligned accurately with the direction of a remote object independently of variations, due to fading or other causes, of the magnitude of received energy reflected from said remote object.

It is contemplated that reflected impulses of radio frequency energy will be received from a plurality of remote objects lying at different distances from the antenna. Therefore, means are provided for rendering the receivers 23, 26 and cathode ray tube 29 operative as hereinbefore described only during the reception of reflected energy from a remote object lying at a predetermined range. The intensity of the electron beam of cathode ray tube 29 is normally slightly less than the magnitude required to produce a visible luminous trace on the screen of said tube 29. Receivers 23 and 26 are normally held in a blocked condition so that said receivers are inoperative to produce output voltages in response to energy applied thereto. The voltage impulses produced by keyer 11 are applied through a variable delay circuit 41 to the control grid of cathode ray tube 29 and to receivers 23 and 26, thereby simultaneously unblocking said receivers and intensifying the electron beam of said cathode ray tube sufficiently to cause said electron beam to produce visible fluorescence of the screen of said tube. The time delay introduced by variable delay circuit 41 is adjustable in accordance with the range of a remote object.

Thus, the apparatus functions to provide a visible indication of the direction of a remote object which lies at a distance $$R = ct/2$$

where $c$ is the velocity of wave propagation and $t$ is the time delay introduced by variable delay circuit 41.

Antenna 13 may comprise a plurality of coplanar parallel one-half wave length elements 19, 20 with spacing between adjacent elements equal to one-half wave length, and a plane reflector 21 parallel to the plane of elements 19, 20 at a distance therefrom of the order of 0.2 wave length. Elements 19, 20 are divided into two groups symmetrically positioned with respect to axis Y—Y. Elements 19, 20 are excited in phase by energy produced by transmitter 12, so that antenna 13 radiates a directional beam of energy the axis of which is perpendicular to the plane of the elements. Receivers 23 and 26 are so connected to antenna 13 that the phase shift produced by the sections 15, 16 of transmission line causes the directions of maximum response as measured at receivers 23 and 26 respectively to be divergent at equal angles with respect to the axis of the directional beam when the length $d_1$ of line section 16 is equal to the length $d_2$ of line section 15.

In a modified form the invention provides visual indication of both the range and direction of remote objects. Means are provided for causing the electron beam of the cathode-ray tube 29 to traverse the screen in a horizontal direction at a known rate subsequent to the transmission of each impulse of radio frequency energy. Consequently, the horizontal axis of the cathode-ray tube screen may be calibrated in units of distance. The form of the visual presentation provided for the indication of both range and direction is shown in Fig. 3. In Fig. 3 there is shown the indication of a remote object at a range of fifty miles and in the direction of the axis O of the antenna 13. There are also shown indications of objects at ranges of twenty and seventy miles lying to the right and left, respectively, of the axis O of antenna 13.

The modification of the invention to provide the form of indication shown in Fig. 3 may be accomplished by connecting the keyer 11 through switch 44 to a sweep voltage generator 43. The output of the sweep voltage generator is applied to the horizontal deflection plates 27, 28, superimposed on the output voltages of the receivers 23, 26. The potential of the control grid 42 is adjusted to give a steady visual fluorescence of the screen of the cathode-ray tube 29 during the time the electron beam traverses the screen.

The advantages of the form of presentation shown in Fig. 3 will be apparent from a consideration of the fact that range and bearing information on all objects detected by the apparatus is provided simultaneously in a form which may be easily and quickly interpreted by an observer.

It will be understood that the invention is not limited by the exemplary embodiment herein illustrated and described and that the scope of the invention is to be determined from the appended claims.

The invention described herein may be manufactured and used by or for the Government of the United States of America for governmental purposes without the payment of any royalties thereon or therefor.

What is claimed is:

1. Radio echo apparatus comprising a directional antenna responsive to echo signals, two receivers having equal gain, phasing means interposed between the antenna and each receiver for deriving intersecting directional response patterns at the respective receivers whereby a reference direction will be defined by the intersection of the response patterns, a cathode-ray tube indicator, means for coupling the echo signal output of the respective receivers to opposed horizontal deflecting means of the cathode-ray tube, and means for coupling the echo signal output of both receivers to the same vertical deflecting means of the cathode-ray tube.

2. Radio echo apparatus comprising a directional antenna responsive to echo signals, two receivers having equal gain, phasing means interposed between the antenna and each receiver for producing intersecting directional response patterns at the respective receivers whereby a reference direction will be defined by the intersection of the response patterns, visual indicator means differentially responsive to the echo signal output of the two receivers, transmitter means for generating impulses of radio frequency energy, phasing means interposed between the transmitter and the antenna for concentrating the transmitted energy in the reference direction, and means for rendering the receivers and the indicator operable to be energized by echo signals from a remote object at a predetermined range.

3. Radio echo apparatus comprising a directional antenna responsive to echo signals, two receivers having equal gain, phasing means interposed between the antenna and each receiver for deriving intersecting directional response patterns at the respective receivers whereby a reference direction will be defined by the intersection of the response patterns, a cathode-ray tube indicator, means for coupling the echo signal output of the respective receivers to opposed horizontal deflecting means of the cathode-ray tube, means for coupling the echo signal output of both receivers to the same vertical deflecting means of the cathode-ray tube, transmitter means for generating impulses of radio frequency energy, phasing means interposed between the transmitter and the antenna for concentrating the transmitted energy in the reference direction, and means for rendering the receivers and the indicator operable to be energized by echo signals returned from a remote object at a predetermined range.

4. Radio echo apparatus comprising a directional antenna responsive to echo signals, two receivers having substantially equal gain and tuned to the same frequency, phasing means interposed between the antenna and each receiver for producing intersecting directional response patterns at the respective receivers whereby a reference direction will be defined by the intersection of the response patterns, visual indicator means differentially responsive to the echo signal output of the two receivers, transmitter means for generating impulses of radio frequency energy, and phasing means interposed between the transmitter and the antenna for concentrating the transmitted energy in the reference direction.

5. Radio echo apparatus comprising a directional antenna responsive to echo signals, two receiving channels having substantially equal gain and tuned to the same frequency, phasing means interposed between the antenna and each receiving channel for deriving intersecting directional response patterns at the respective receiving channels whereby a reference direction will be defined by the intersection of the response patterns, a cathode-ray tube indicator having space quadrature related deflecting means, means for coupling the differential echo signal output of the receiving channels to one deflecting means of the cathode-ray tube, means for coupling the combined echo signal output of both receivers to the quadrature deflecting means of the cathode-ray tube, transmitter means for generating impulses of radio frequency energy, and phasing means interposed between the transmitter and the antenna for concentrating the transmitted energy in the reference direction.

6. Radio echo apparatus comprising a directional antenna responsive to echo signals, two receivers having substantially equal gain, phasing means interposed between the antenna and each receiver for deriving intersecting directional response patterns at the respective receivers whereby a reference direction will be defined by the intersection of the response patterns, a cathode-ray tube indicator having first and second quadrature related deflecting means, means for coupling the differential echo signal output of the receivers to one deflecting means of the cathode-ray tube, and means for coupling the combined echo signal output of the receivers to the other deflecting means of the cathode-ray tube.

7. Radio echo apparatus comprising a directional antenna response to echo signals, a pair of receiving channels having substantially equal gain, phasing means interposed between the antenna and each of the receiving channels for deriving intersecting directional patterns at the respective receiving channels whereby a reference direction will be defined by the intersection of the response patterns, a cathode-ray tube indicator having at least a pair of space quadrature related deflecting means, means coupling the differential echo signal output of said receiving means to one of the deflecting means of the cathode-ray tube, means for coupling the combined echo signal output of the receiving channels to the other deflecting means of the cathode-ray tube, a transmitter for generating periodic radio frequency impulses, a sweep generator synchronized with said transmitter for deflecting the beam along a time base to indicate object range, and phasing means interposed between the transmitter and the antenna for concentrating the transmitted energy in the reference direction.

ROBERT M. PAGE.

REFERENCES CITED

The following references are of record in the file of this patent:

UNITED STATES PATENTS

| Number | Name | Date |
| --- | --- | --- |
| 2,400,641 | Hardy | May 21, 1946 |
| 2,409,462 | Zworykin et al. | Oct. 15, 1946 |
| 2,412,702 | Wolff | Dec. 17, 1946 |